June 8, 1954  R. H. McDANIEL  2,680,797
WELDING APPARATUS

Filed March 19, 1952  3 Sheets-Sheet 1

INVENTOR
*Rankin H. McDaniel*

BY *Strauch, Nolan & Diggins*
ATTORNEYS

June 8, 1954  R. H. McDANIEL  2,680,797
WELDING APPARATUS
Filed March 19, 1952  3 Sheets-Sheet 2
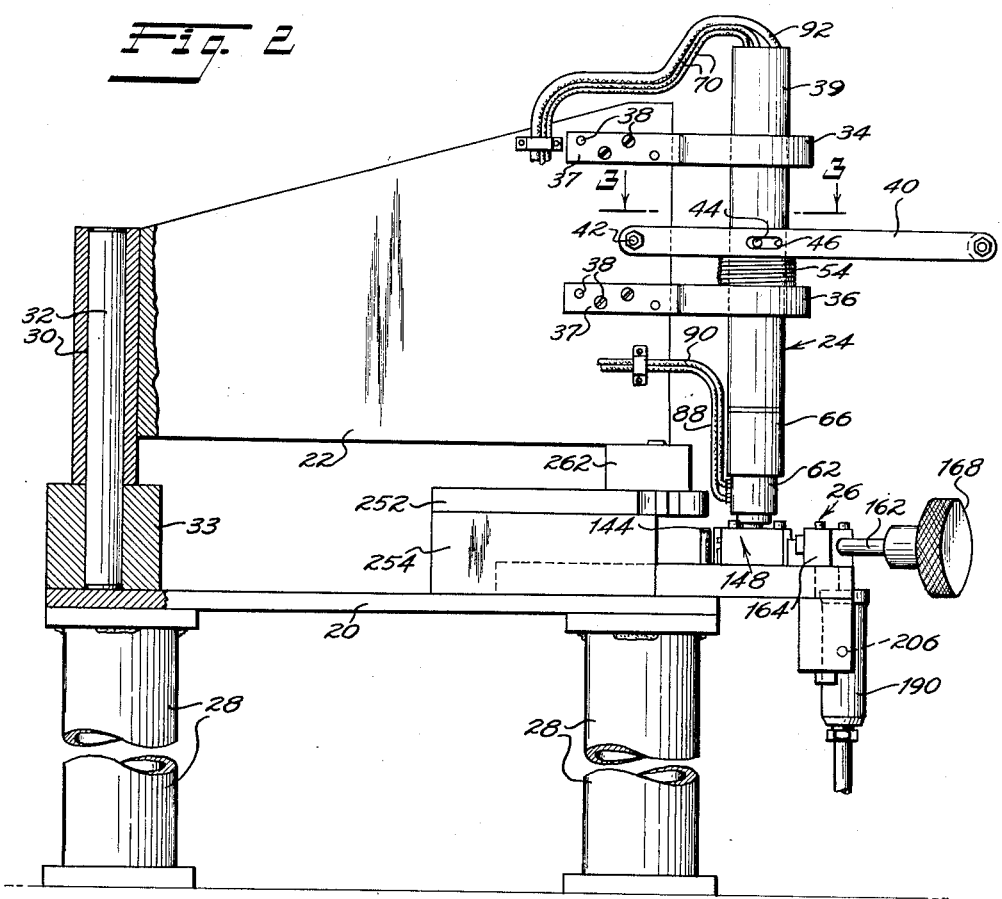
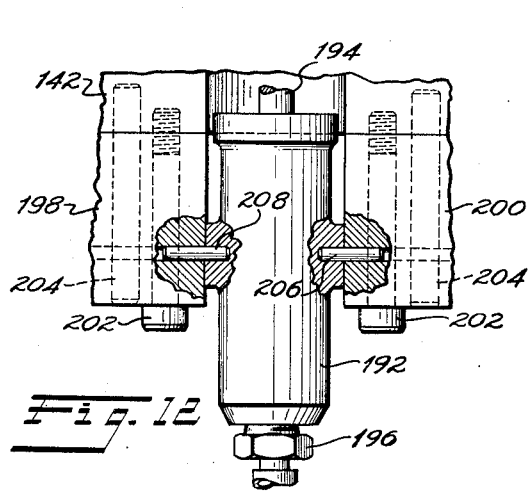
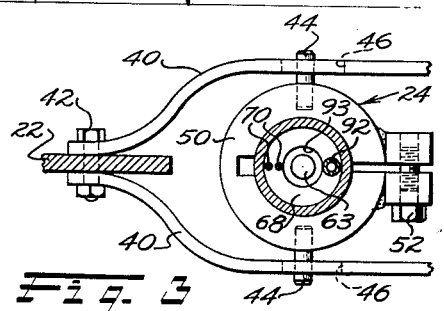
INVENTOR
Rankin H. McDaniel
BY Strauch, Nolan & Diggins
ATTORNEYS June 8, 1954   R. H. McDANIEL   2,680,797
WELDING APPARATUS
Filed March 19, 1952   3 Sheets-Sheet 3
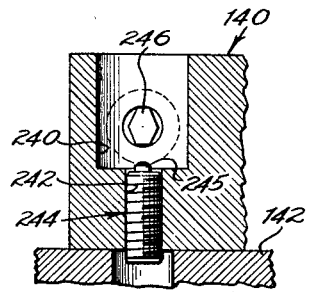
Fig. 11-A
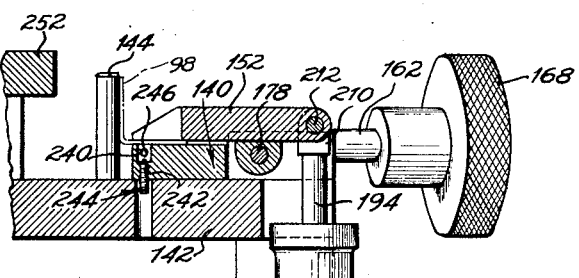
Fig. 11
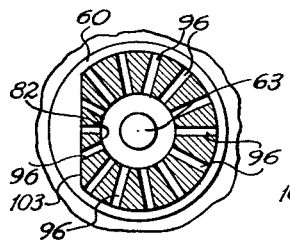
Fig. 5
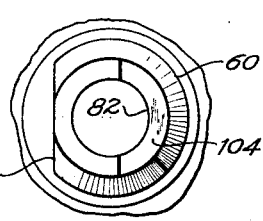
Fig. 6
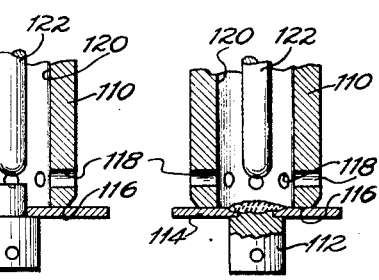
Fig. 7   Fig. 8
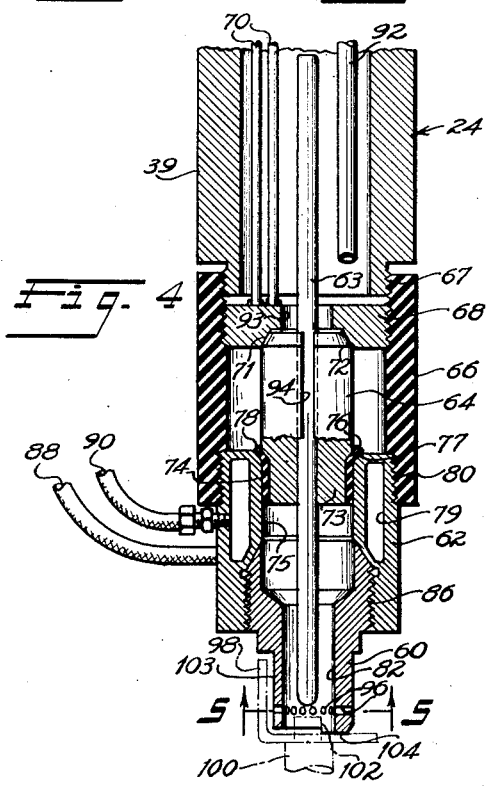
Fig. 4
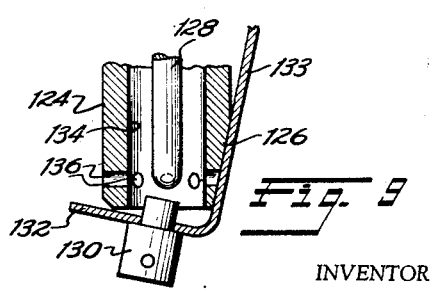
Fig. 9
INVENTOR
*Rankin H. McDaniel*
BY *Strauch, Nolan & Diggins*
ATTORNEYS Patented June 8, 1954

2,680,797

UNITED STATES PATENT OFFICE 2,680,797

WELDING APPARATUS

Rankin H. McDaniel, Vista, Calif., assignor to Solar Aircraft Company, San Diego, Calif., a corporation of California Application March 19, 1952, Serial No. 277,443

1 Claim. (Cl. 219—8)

The present invention relates to improvements in the art of securing to metallic structures members such as studs, rivets, screws, or the like which are formed of a heat resistant metal such as stainless steel and more particularly to improvements in the art of securing to metallic structures members of this type by arc welding.

Prior to my invention it has been customary in securing such members to metallic structures by arc welding either to press the member against the surface of the metallic structure during the time the actual arc welding occurs or to provide an aperture in the metallic structure through which the shank of the member extends and to provide the member with an enlarged head which is fused during the welding operation to the metallic structure. Examples of stud welding apparatus operative in accordance with the former type of these prior art methods will be found in Patent No. 2,315,502, issued April 6, 1943, to J. D. Crecca et al. for Sub-Aqueous End-Welding Device; Patent No. 2,451,190, issued October 12, 1948, to F. W. Anderson for Stud Welding Gun; Patent No 2,474,531, issued June 28, 1949, to J. M. Keir et al. for Method of and Apparatus for Electrically Welding Studs to Surfaces, and in Patent No. 2,491,479, issued December 20, 1949, to E. Dash for Arc Welding of Studs. Examples of apparatus for securing members to metallic structures in the latter manner will be found in Patent No. 2,394,626, issued February 12, 1946, to A. C. McCann et al. for Welding Apparatus, and in Patent No. 2,458,928, issued January 11, 1949, to P. E. Brooks for Welding Fixture.

These prior art methods of and apparatus for securing members such as studs, rivets, screws or the like to metallic structures by arc welding have proved to be unsatisfactory when such members must be formed of a heat resistant metal such as stainless steel.

In recent years much time and effort has been expended in an effort to achieve a satisfactory and inexpensive manner of securing to metallic structures members such as screws, studs, rivets and similar members, which are formed of heat resistant metals such as stainless steel. Various combinations of pressure, heat, and resistance welding have been tried for this purpose but none have produced completely satisfactory results because they have failed to produce a satisfactory bond between the member and metallic structure, have involved the use of elaborate and expensive equipment, and have threatened damage to the metallic structure especially in instances where space limitations are critical.

In securing members of this type which are formed of a heat resistant metal to a metallic structure, better welds are achieved when the molten metal is shielded by an inert gas. The Dash patent, aforesaid, is one example of the apparatus developed in the past for applying shielded arc methods to stud welding.

Prior to my invention the shielding of the arc in stud welding by a stream of inert gas has produced certain imperfections in the resultant weld which weaken the bond between the stud and the metallic structure to which it is secured. I have found that these imperfections are caused by the lateral spreading of the molten metal under the influence of the inert gas pressure and by the entrainment of particles of molten metal in the inert gas stream.

A further disadvantage of the prior art methods and apparatus for securing studs and the like to metallic structures by shielded arc welding has been the tendency toward arcing between the stud and the surrounding shield. This tendency has resulted primarily from the necessity in prior art methods and devices that the stud project up into the shield for substantially the entire length of the stud.

A major object of my invention is to provide an apparatus for securing members formed of heat resistant metal to a metallic structure by welding in which means are provided for properly aligning and spacing a welding electrode relative to the portion of the member to be fused and in which means are provided for so blanketing the molten metal during welding with an inert gas that the molten metal is not displaced by the gas.

It is, accordingly, a further object of my invention of primary importance to provide a novel and improved method by which members such as studs, rivets, screws or the like which are made of deformation and heat resistant metals such as stainless steel can be rapidly and inexpensively secured to a metallic structure.

A further object of primary importance of my invention is to provide an improved apparatus for securing members such as studs, screws, rivets or the like to a metallic structure by arc welding in the presence of an inert gas by which the flow of the shielding inert gas is so controlled that the entrainment of molten metal particles in the inert gas stream and lateral displacement of molten metal by the inert gas are substantially eliminated.

More specifically, it is an object of my invention to provide a novel and improved method of apparatus by which heat and deformation resistant metallic members such as studs, rivets, screws or the like can be secured to a metallic structure by arc welding in an enveloping inert gas the flow of which is so controlled that such gas will not displace the molten metal during arc welding to deleteriously affect the weld.

More specifically it is an object of my invention to provide an improved apparatus for and method of securing such members to a metallic structure by arc welding in the presence of a shielding inert gas by which the flow of such inert gas is so controlled that the tendency found in prior art devices, of the pressurized inert gas to blow the molten metal out laterally of the weld is eliminated.

A further object of my invention is to provide an apparatus for arc welding such members to a metallic structure in an inert atmosphere by which the electrode and member to be welded are so relatively positioned that the tendency toward arc formation between the electrode and the surrounding electrically conductive shield which confines the inert gas is materially reduced.

More specifically it is an object of my invention to provide a shielded arc welding method and apparatus as a substitute for riveting and stud riveting of heat resistant high alloy members which is of particular utility in tight corner conditions.

Still more specifically, it is an object of my invention to provide an improved method and apparatus for securing heat resistant metal members such as studs, rivets, screws or the like to a metallic structure by arc welding in which the molten metal is blanketed by a continuous flowing stream of inert gas the major portion of which must either flow upwardly from the molten metal to be discharged from the apparatus in opposition to the gravitational effect thereon or which is otherwise discharged from the apparatus in such a manner as to prevent the entrainment of particles of molten metal in the inert gas.

A further object of my invention is to provide an improved welding apparatus which may be utilized as a substitute for riveting and stud riveting apparatus in operations upon high alloy heat resistant parts, which is adapted for the rapid successive securing of a plurality of such members to a single metallic structure while maintaining the accurate alignment and positioning of such members relative to the metallic structure.

These and other objects of this invention will become more fully apparent by reference to the appended claims and as the following detailed description proceeds in reference to the accompanying drawings wherein like numerals have been used to designate like parts and wherein:

Figure 2 is a partially sectioned elevation view of such apparatus;

Figure 3 is a fragmentary sectional view of such apparatus taken substantially along the line 3—3 of Figure 2;

Figure 4 is a fragmentary sectional view of the lower portion of the welding torch of such apparatus and showing a preferred form of inert gas discharge nozzle;

Figure 5 is a sectional view of the gas discharge nozzle of the welding torch of Figure 4 taken substantially along the line 5—5 of Figure 4;

Figure 6 is a bottom end view of such gas discharge nozzle;

Figure 7 is a fragmentary sectional view of a modified form of gas discharge nozzle and illustrating the relationship of the nozzle, the electrode, the metallic structure, and the member to be secured to such metallic structure, prior to the initiation of the welding operations;

Figure 8 is a fragmentary sectional view of the lower end of the gas discharge nozzle of Figure 7 illustrating the relationship of the electrode, welding tip, metallic structure, and the member secured to the metallic structure after the completion of the welding operation;

Figure 9 is a sectional view of a further modified form of gas discharge nozzle adapted for use in securing members to a metallic structure in tight corner condition and illustrating the relationship of such nozzle, the electrode, the metallic structure, and the member to be secured to such metallic structure prior to the initiation of a welding operation;

Figure 11 is a sectional view taken along the line 11—11 of Figure 1 and illustrating the relationship of the various components of the work piece clamping structure of such welding apparatus;

Figure 11A is an enlarged section of the structure for supporting and aligning the member in position for welding to the metallic structure; and Figure 12 is a partially sectioned elevation view of one of the fluid operating motors of the hold down means illustrated in Figure 11.

General description

In its broader aspects, my present invention contemplates an improved method of securing members such as studs, rivets, screws and the like to a metallic structure by arc welding in which the portions of such members and the metallic structure which are fused during the welding operation are blanketed with a continuously flowing stream of inert gas without the entrainment of molten metallic particles in the gas or the displacement of the molten metal by the flowing gas. In detail the complete method of my invention comprises the following steps: 1, the formation of a projection upon the member; 2, the formation of an aperture through the work piece or metallic structure which is like in cross-section to that of the projection; 3, so clamping the member and metallic structure together that the projection extends through the aperture; 4, blanketing the projection and the surrounding portion of the metallic structure with a layer of an inert gas; 5, continuously supplying and removing inert gas from such layer in streams which are so directed and controlled that molten metal of the projection will not be displaced by the flowing gases or particles of such metal entrained therein; and 6, fusing the projection and adjacent portion of the metallic structure together by the establishment and maintenance of an electric arc to the projection while it is so blanketed.

In order to most easily practice the method of my invention, I have provided a novel and improved welding apparatus and three forms of inert gas nozzles therefor which will now be described in detail.

Figure 1:
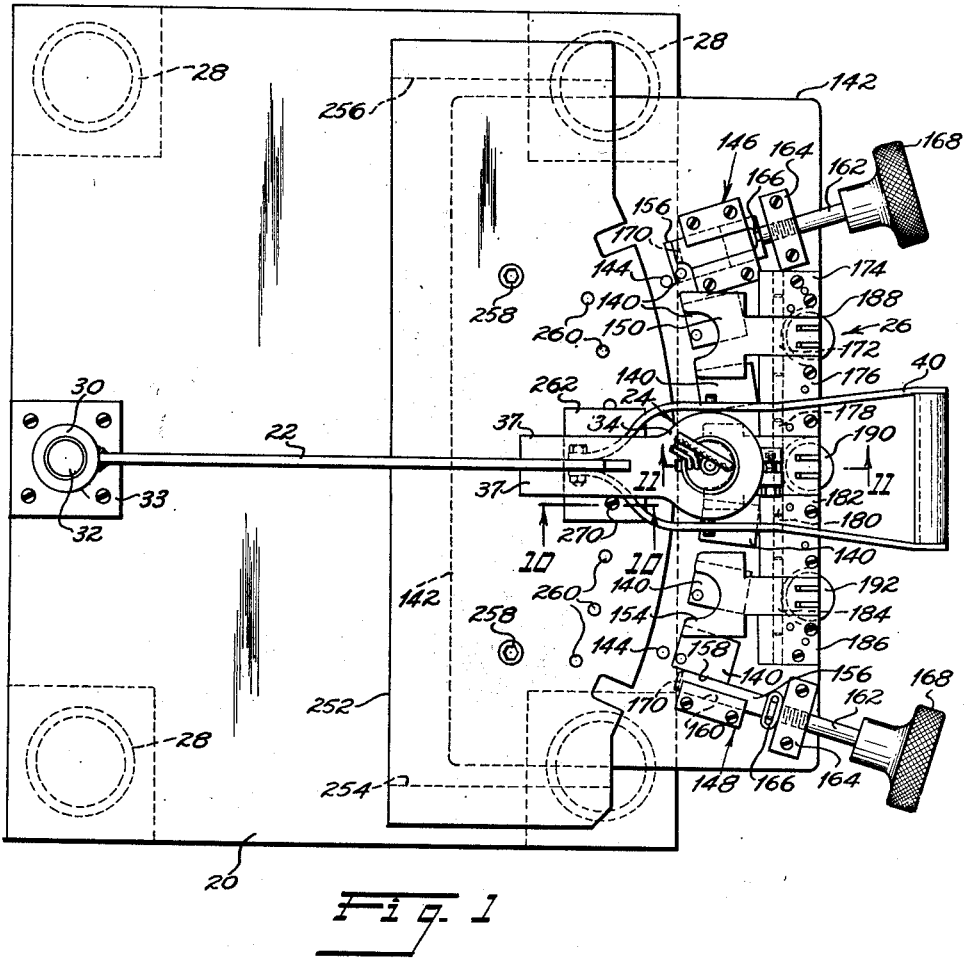
Figure 1 is a plan view of a welding apparatus embodying the preferred form of my invention.

Referring first to Figures 1 and 2 of the drawings, it is therein seen that the disclosed welding apparatus embodying the principles of my invention comprises, in general, a base 20, a welding torch support bracket 22 of generally platelike construction pivotally mounted at one end upon the base 20, a welding torch assembly 24 reciprocably mounted at the opposite end of the support bracket 22 for translatory movement along a path parallel to the pivot axis of the bracket 22 on base 20, and a workpiece hold down assembly 26 disposed on the base structure 20 beneath the arcuate path of movement of the welding torch assembly 24.

As is most clearly shown in Figure 2, the base 20 is supported upon spaced legs 28. The bracket 22 is fixed to a tubular member 30 which is rotatably received upon a shaft 32 that is fixed at its lower end to the base 20 in a mounting block 33 thereon.

Torch mounting

The welding torch assembly 24 is reciprocably mounted upon the bracket 22 at its free or opposite end by a pair of spaced collars 34 and 36 the bores of which are coaxially aligned and each of which is provided with a bifurcated projection 37 which straddles the adjacent edge of bracket 22 and which is suitably secured to bracket 22 as by screws 38.

As illustrated in Figure 2, the welding torch assembly 24 is shown in its lower or welding position. The welding torch assembly 24 includes a generally tubular member 39 which is axially slidably received through the bores of collars 34 and 36. The vertical reciprocation of welding torch assembly 24 as guided by collars 34 and 36 is controlled by a handle 40 which is pivotally mounted upon the bracket 22 by a pivot pin 42 fixed thereto intermediate the collars 34 and 36. Handle 40 straddles the member 39 as is most clearly shown in Figure 3, and is operatively connected thereto by pin and slot connections formed by pins 44 fixed relative to the welding head assembly 24 which engage slots 46 in the handle 40. A split collar 50 surrounds member 39 intermediate collars 34 and 36 and is fixed thereto by a clamping screw 52. The pins 44, which are fixed in diametrically opposed radial extending positions in the split collar 50, engage the slots 46 of the opposite arms of the handle 40 to form the pin and slot connection.

The welding torch assembly 24 is normally biased upwardly from the position shown in Figure 2 by a compression spring 54, shown in its compressed condition, which abuts at its lower end upon the top surface of collar 36 and at its upper end against the lower face of the collar 50 fixed to the member 39 of the welding torch assembly. In operation, torch 24 is lowered to its welding position by the operator's pulling down handle 40 and is automatically returned by the action of spring 54.

Torch structure

The structure of the welding torch assembly 24 is best illustrated in Figure 4, wherein the lower portion thereof is shown in cross section. The welding torch assembly 24 consists primarily of a gas nozzle 60, a cooling jacket 62, an electrode 63, an electrode holder 64, and a sleeve 66, formed of insulating material such as Micarta, which connects these components to the tubular member 39 which forms the main body of the welding torch assembly 24.

In assembly, the upper end of sleeve 66 is threaded onto the lower portion of the tubular member 39 as indicated at 67. A coupling 68 is threadedly received within the sleeve 66 below the threaded connection 67. Electrical connection is made from a conventional arc welding power supply to the coupling 68 via the wires 70 which extend downwardly through the tubular member 39.

The electrode holder 64 is a sleeve of longitudinally split construction by which it can be operated to grip or release the electrode 63 within the welding torch assembly 24. The electrode holder 64 is formed at its upper end with an external bevel 71 which projects into a truncated conical recess 72 formed in the lower face of the coupling 68 and at its lower end with a reduced portion 73 upon which is received an insulating sleeve 74 and which projects into the upper end of the central through bore 75 of the cooling jacket 62. Holder 64 and cooling jacket 62 are formed respectively with mating conical surfaces 76 and 77 between which an outwardly flared portion 78 of insulating sleeve 74 is interposed. The clamping action of the electrode holder 64 upon the electrode 63 is controlled by wedging it between the recess 72 on coupling 68 and the flared portion 78 of insulating sleeve 74.

The water jacket 62, which is of generally hollow construction as shown at 79 to permit passage of a cooling fluid such as water therethrough, externally is threadedly connected to the lower end of the sleeve 66 as indicated at 80. The clamping of the electrode 63 by holder 64 is effected by rotating the water jacket 62 relative to the sleeve 66 a quarter turn in one direction while release of electrode is effected by rotation of jacket 62 a quarter turn in the opposite direction. Rotation in said one direction will wedge the beveled end 71 of the electrode holder 64 tightly into the recess 72 and the flared portion 78 of insulator 74 tightly against surface 76 to clamp the electrode 63 while rotation in the opposite direction will release the wedging action and thereby free the electrode 63.

The nozzle 60 controls the flow of inert gas around the tip of electrode 63 and over the parts of the member to be fused. Nozzle 60 is formed with a longitudinal bore 82, through which the electrode 63 coaxially projects, and is threadedly received within the lower end of the cooling jacket 62 as indicated at 86. Flexible inlet and outlet conduits 88 and 90 are provided for transmitting a cooling fluid such as water to and from hollow portion 77 of the cooling jacket 62.

The upper end of the tubular member 39, which is not shown in Figure 4, is sealed. A pipe 92, which extends through the sealed end of member 39, as do wires 70, extends downwardly through the bore of member 39 to a position slightly above the coupling 68 as is shown in Figure 4. Inert gas is introduced into the welding torch assembly 24 through this pipe 92. The inert gas flows into the bore of the tubular member 39, through the central aperture 93 of the coupling 68, along the longitudinal split 94 of the electrode holder 64, through the hollow central bore 75 of the water jacket 62 and through the bore 82 of the nozzle 60.

Nozzle structure

The structure of the nozzle 60 and the manner in which it controls the flow of gas is best understood by reference to Figures 4 to 6 inclusive. As is shown in Figure 5, a plurality of preferably radially extending and equiangularly spaced holes 96, which communicate between bore 82 and the atmosphere surrounding nozzle 60, are formed through the wall of the nozzle 60 to permit egress of the inert gas therefrom at points above the lower end thereof.

In Figure 4, a metallic structure or work piece 98 and a member 100 such as a stud, which is provided with a projection 102 extending through an aperture of the work piece 98, are illustrated in phantom lines to show the interrelation to the electrode 63 and the end of nozzle 60 when the welding torch assembly 24 is in its operative or welding position prior to the initiation of the arc. As will be noted in Figure 4, holes 96 are located above the level of the top of the projection 102 on member 100 so that there is no tendency toward entrainment of molten metal from projection 102 in the inert gas discharged therethrough during the actual welding operation.

The particular form of nozzle 60 illustrated in Figure 4 is particularly adapted for use in close corners conditions such as in securing studs to a workpiece of angular cross section closely adjacent the angle thereof but is not limited to such use. To facilitate its use for this purpose, a segmental portion of the body of nozzle 60 has been cut away leaving a flat face 103. By this construction, a stud such as 100 can be secured to an angular workpiece such as 98 closely adjacent its vertical wall without misalignment of the electrode 63 relative the projection 102.

As can best be seen by reference to Figures 4 and 6, a portion of the end face of the nozzle 60 has been removed so that when the welding torch assembly 24 is lowered into its operative position, the end face of nozzle 60 abuts against the workpiece 98 only along the arcuate end face portion 104. End face portion 104 serves as a lower limit stop for the torch assembly 24 to accurately position the lower end of electrode 63 relative to the adjacent end of projection 102. The end face of the nozzle 60 is cut away so that it will contact the workpiece 98 only along a small sector and thus prevent excessive cooling of the workpiece at the side the projection 102 adjacent the center of workpiece 98 while providing the necessary cooling effect for the workpiece 98 at the side of projection 102 adjacent the edge.

By this nozzle construction, the inert gas flowing downwardly through the bore 82 of the nozzle 60 will blanket the projection 102 of the member 100 and the surrounding portion of the work piece 98, a major portion of the inert gas being discharged through the holes 96 and the remainder thereof passing through the continuous arcuate opening formed between the cut back end of the nozzle 60 and the adjacent portion of the work piece. Since the opening formed between the work piece 98 and the end of the nozzle 60 is a continuous opening rather than small spaced apertures, the portion of the inert gas passing therethrough will flow smoothly from the nozzle 60 without forming jets of gas which tend to entrain the molten metal of the projection therein. The major portion of the gas blanketing projection 102 will flow upwardly in opposition to the force of gravity and be discharged through holes 96 due to the pressure differential resulting from the flow of gas through holes 96.

This improved nozzle construction permits the formation of a blanketing layer of inert gas over the projection 102 during the period of fusion thereof and the continuous introduction and discharge of inert gas from such blanketing layer without producing displacement of the molten metal during welding by the gas or entrainment of metallic particles therein, discharge of the inert gas being primarily effected in opposition to the force of gravity through openings 96 and secondarily through the continuous arcuate opening between the work piece and nozzle and face.

A modified form of welding torch nozzle is illustrated in Figure 7. This nozzle 110 is adapted for general use in securing members such as stud 112 to a work piece or metallic structure 114 at locations where no close corner conditions exist. In this form of nozzle, the nozzle 110 when in its welding position abuts against the work piece 114 as a lower limit stop for the torch 24 along its entire continuous end face 116. A plurality equiangularly spaced apertures 118 are formed through the wall of the nozzle 110 to permit the discharge of the inert gas therefrom. The inert gas, as in nozzle 60 of Figure 4, flows downwardly through the central bore 120 of the nozzle 110 around the centrally disposed electrode 122. In this form of the invention, the inert gas flows downwardly around the electrode 122, a portion forming the outer layer adjacent the wall of bore 120 passing outwardly from nozzle 110 through holes 118, and the remainder flowing downwardly to form a blanketing layer over the projection of the member 112 and the surrounding portion of the work piece 114 confined within the bore 120.

This remaining portion will flow outwardly toward the wall of bore 120 and then upwardly for discharge through holes 118. In this form of nozzle the major portion of the inert gas flows downwardly, reverses its direction of flow below the level of the apertures 118 and then flows upwardly and out through the apertures 118. Since the apertures 118 are located above the level of the molten metal formed during the passage of electric current, the gas which contacts the molten metal flows upwardly toward the discharge apertures 118 in opposition to the gravitational effects thereon thus preventing the entrainment of molten metallic particles in the gas. The smooth continuous blanketing effect of the gas contacting the molten metal, not being in the form of jets at the level of the molten metal, has no tendency to displace the molten metal laterally of the weld as in prior art devices.

Figure 8 illustrates the relationship of the nozzle 110, the electrode 122, the work piece 114, and the member 112 after completion of the weld.

Figure 9 illustrates a still further form of nozzle which is adapted for use in certain corner conditions where a nozzle of the type illustrated in Figures 4 to 6 would not be suitable. In this figure the nozzle 124 differs from the nozzle 110 shown in Figures 7 and 8 in that an inclined planar surface 126, which is normal to the section plane of Figure 9, is formed thereon to permit positioning of the electrode 128 over the projection of a member 130 located more closely adjacent the corner of a workpiece 132 having a high side wall 133 than would be possible with the nozzles 60 or 110. In this construction the planar surface 126 should be so formed on the nozzle that it cooperates with the workpiece to so align the electrode 128 relative to the projection of the member 130 that the axis of the electrode 128 intersects the axis of the projection of the member 130 at the end of the electrode. When thus positioned, a uniform arc will be formed to effect proper fusion of the projection and surrounding portion of the workpiece 132 without any tendency toward arc formation between the nozzle 124 and the electrode 128. In this form of nozzle 124 the pattern of inert gas flow is substantially the same as that in nozzle 60. The outer layer of the inert gas flows downwardly along the wall of bore 134 of nozzle 124 and outwardly through the apertures 136 which are equiangularly spaced about the axis of the bore 134. The central portion of the inert gas stream flows downwardly to form a blanketing layer over the projection of member 130 and the surrounding portion of workpiece 132 and a portion thereof then flows outwardly through the opening formed between the end face of the nozzle 124 and the adjacent portion of the workpiece 132. The remainder of this central portion of the inert gas stream will reverse its direction of flow and be discharged through apertures 136 due to the lower pressure at that point resulting from the rapid flow of gas through apertures 136 as in the previous nozzle embodiments. The first mentioned portion of the inert gas blanketing the projection flows smoothly and uniformly outwardly through the opening formed between the end face of a tip 124 and the workpiece 132 without the entrainment of molten metallic particles in the gas stream.

*Work piece hold down mechanism*

The illustrated form of workpiece hold down mechanism 26, shown generally in Figures 1 and 2 and in detail in Figures 11 and 12, is adapted to hold a workpiece of right angular cross sectional configuration, such as the workpiece 98 shown in Figure 4. It will be understood that the details of this mechanism can be varied to accommodate workpieces of different form without departing from the principles of my invention in its broadest aspects. The illustrated mechanism comprises a plurality of stud holder assemblies 140 mounted on a plate 142 which is secured to the main base 20 of the apparatus. Assemblies 140 are so disposed on the plate 142 and of such construction that each is adapted to hold one of a plurality of members 100 such as studs, rivets, etc. below the arcuate path of movement of the welding torch assembly 24 about the axis of shaft 32. The workpiece 98, which is appropriately apertured to receive the projections on members 100, is placed over the studs and held in position during the welding operation against a plurality of arcuately disposed back up studs 144 by end clamps 146 and 148 and pneumatically actuated hold down clamps 150, 152, and 154.

The end clamps 146 and 148 each comprise a clamping block 156 guided for translatory movement by guideways 158 and 160 along paths radially disposed relative to the pivot axis of the bracket 22. The blocks 156 are actuated along such paths by screws 162 which are threadedly received in aligned blocks 164 fixed to the plate 142 and which are connected to the blocks 156 by rotary connection 166. A handle 168 is fixed upon the outer end of screw 162 to facilitate its rotary manipulation. The end faces of the blocks 156 are provided with a transverse groove 170 which is adapted to straddle the edge of a workpiece. The workpiece is placed in position over the studs and firmly wedged in position by the end clamps 146 and 148 against the arcuately disposed back-up studs 144.

The hold down clamps 150, 152 and 154 are pivotally mounted about a common axis normal to the pivot axis of bracket 22, clamp 150 being pivotally mounted upon a shaft 172 supported between mounting blocks 174 and 176, which are fixed to the plate 142, clamp 152 being pivotally mounted upon a pair of stub shafts 178 and 180 mounted in coaxial alignment in blocks 176 and 182 respectively, and clamp 154 is pivotally mounted upon a shaft 184 which is supported by blocks 182 and block 186 which are fixed to the plate 142.

Pneumatic motors 188, 190 and 192, which are pivotally mounted below plate 142 about a common axis parallel to the common pivot axis of clamps 150, 152 and 154 are connected respectively to actuate clamps 150, 152 and 154. As is best shown in Figures 11 and 12 in reference to motor 192, each of these motors preferably consists of a cylinder having a resiliently biased piston therein, which is not shown, a piston rod 194, which is connected to the piston and projects from the cylinder at one end, and a fluid connection 196 provided for the controlled introduction of fluid into the cylinder at the opposite end. As is shown in Figure 12, the motors are pivotally mounted between mounting blocks 198 and 200, which are fixed to the bottom of the plate 142 as by screws 202 and dowels 204, stub shafts 206 and 208 being provided for this purpose.

As is best shown in Figure 11, a yoke 210, which is fixed to the upper end of the piston rod 194, is pivotally connected to the outer end of each clamp, such as 152, by a pivot pin 212. By this construction, after the workpiece is placed in position and clamped at its ends against the back up studs 144, the pneumatic motors 188, 190 and 192 are simultaneously actuated by the introduction of fluid through the fluid connections 196 to cause the hold down clamps 150, 152 and 154 to pivot about their common pivot axis to firmly clamp the workpiece in position against the blocks 140 fixed to the plate 142. Fluid pressure on motors 188, 190 and 192 is maintained until the welding operation is completed.

As is best shown in Figures 11 and 11A, the stud positioning assemblies 140 are each provided with a stud receiving recess 240 and a through threaded aperture 242 coaxially aligned therewith. A spring assembly 244, which is threaded through the opening 242 has a resiliently biased projection 245 which projects upwardly into the recess 240 to resiliently abut against the bottom end of a stud, screw or rivet placed in the recess 240 to bias it outwardly thereof. At diametrically opposed sides of the recess 240 resiliently biased gripping elements, such as 246, are provided to hold the stud within the recess 240 and in the case of diametrally apertured studs such as 112 and 130 of Figures 7 to 9 inclusive to accurately align such apertures relative to the workpiece to which the stud is to be secured.

*Torch alignment relative to the workpiece and members*

As is best shown in Figures 1 and 2, a plate 252 is mounted upon the base 20 in spaced parallel relation thereto beneath the path of movement of the bracket 22 and projecting over plate 142. This plate 252 is suitably supported by mounting blocks 254 and 256 and suitably secured to the base as by screws 258 which, in addition, hold the plate 142 in position upon the base 20. The top surface of the plate 252 is formed with a plurality of recesses 260 which are arcuately disposed about the pivot axis of the bracket 22 and which are like in number to the number of studs to be secured to the workpiece.

Figure 10:
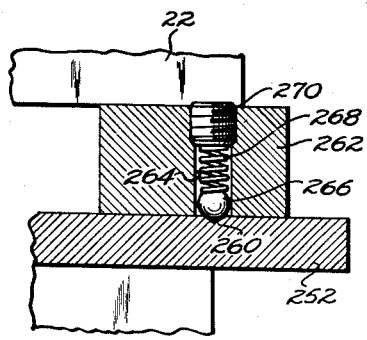
Figure 10 is a fragmentary sectional view of the welding apparatus of Figure 1 taken substantially along the line 10—10 of Figure 1.

A block 262 is fixed to the bottom edge of the bracket 22 at its free end for movement therewith over the arcuately disposed recesses 260. As is best shown in Figure 10, which is a sectional view through the block 262 taken along the line 10—10 of Figure 1, block 262 is formed with a through bore 264 in which is mounted a ball 266 and a compression spring 268 compressed against the top of ball 266 by a screw 270 threadedly received within the top end of a bore 264. The ball 266, as is shown in Figure 10, is suitably positioned to engage the several notches 260 formed in the top surface of the plate 262 to coact therewith to form a detent to accurately align the torch 24 relative to the stud holding recess 240 of the blocks 140.

Operation

After the electrode 63 is properly positioned reltive to the end face of the nozzle and clamped in position by holder 64, the torch 24 is swung into position over the first stud to be welded, proper alignment relative thereto being effected by the engagement of the ball 266 with the corresponding notch 260. Handle 40 is then pulled down to depress the torch 24 to the position shown in Figure 2, bringing nozzle 60 into contact with the workpiece 98 as shown in Figure 4. It should be noted that in this position, the nozzle completely encloses the head 102 of stud 100.

A foot lever, not shown, controls the flow of electricity through wires 20 and the flow of inert gas through tube 92 simultaneously so that as the arc is struck between the electrode 63 and the stud head 102, the head is bathed or blanketed in inert gas which flows through tube 92, around the stud head and out through holes 96 and the cutaway end portion of the nozzle 60, thus eliminating ambient atmosphere which, if allowed to contact the stud while it is in a molten state or still extremely hot, would have a deleterious effect, causing cracks in the weldment.

A control box, not shown, controls the time of the arc and the time of the gas flow, the latter lasting approximately a second longer than the arc time to insure protection of the hot, newly formed head. Upon completion of the first heading operation, handle 40 is released, spring 54 raises the torch 24. Torch 24 is repositioned as before above the next stud to be welded. It should be noted that positioning the electrode in the electrode holder need be carried out only after a large number of weldments have been accomplished as the electrode 63 is of the type known as "non-consumable" electrodes.

When all studs 100 on the workpiece 98 have been headed, clamps 150, 152, 154 and end clamps 146 and 148 are released, the workpiece is removed and a new set of studs and a workpiece are positioned on the backup or cooling block 142.

As can be seen most clearly in Figures 4 and 6, the nozzle 60 contacts the workpiece 98 only over a small area where the greatest amount of heat from the arc must be removed as quickly as possible. The remainder of the nozzle tip is cut away, not only so too much heat will not be removed, but also to allow a uniform flow of inert gas over the stud head.

It is obvious that inexpensive templates and backup bars can be made to automatically position the torch to the workpiece in a variety of forms. It also can be seen that this method can be used to head studs and rivets horizontally or vertically, it being important in vertical usage only to more closely control the time limitations of the arc.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by the United States Letters Patent is:

A device for securing a plurality of studs to a base member, comprising, in combination, a base, a support mounted on said base for pivotal movement about an axis, a welding torch mounted on said support for reciprocation along an axis parallel to the support pivot axis, means arcuately disposed on said base beneath said welding torch for holding a plurality of studs in spaced relation on said base beneath the arcuate path of movement of said torch about said pivot axis, detent means on said base and said support for aligning said torch with each of said studs, and hold down means for clamping an appropriately apertured base member to said base over said studs.

References Cited in the file of this patent

UNITED STATES PATENTS

| Number | Name | Date |
| --- | --- | --- |
| 1,410,421 | Steele | Mar. 21, 1922 |
| 1,718,715 | Spencer | June 25, 1929 |
| 1,873,619 | Mojonnier | Aug. 23, 1932 |
| 2,136,619 | Johnson | Nov. 15, 1938 |
| 2,405,033 | Grimes | July 30, 1946 |
| 2,550,495 | Pilia | Apr. 24, 1951 |
| 2,610,278 | Graham | Sept. 9, 1952 |